United States Patent [19]
Kim

[11] Patent Number: 5,990,623
[45] Date of Patent: Nov. 23, 1999

[54] METHOD FOR CONTROLLING DEGAUSSING COIL OF CATHODE RAY TUBE

[75] Inventor: Joung-soo Kim, Seoul, Rep. of Korea

[73] Assignee: Samsung Electronics Co., Ltd., Kyungki-Do, Rep. of Korea

[21] Appl. No.: 09/153,033

[22] Filed: Sep. 15, 1998

[30] Foreign Application Priority Data

Sep. 25, 1997 [KR] Rep. of Korea .................... 97/48623

[51] Int. Cl.⁶ .................................................. H04N 9/29
[52] U.S. Cl. .............................................. 315/8; 361/150
[58] Field of Search ......................... 315/8, 85; 361/150; 348/820

[56] References Cited

U.S. PATENT DOCUMENTS 4,458,178  7/1984  Tenney et al. ............................. 315/8
5,696,565  12/1997  Shintani et al. ........................ 315/8 X

*Primary Examiner*—Justin P. Bettendorf
*Attorney, Agent, or Firm*—Sughrue, Mion, Zinn, Macpeak & Seas, PLLC

[57] ABSTRACT

A degaussing coil is driven when a driving request for the degaussing coil is received after turning on of a main power supply of a cathode ray tube and a driving request for the degaussing coil is set when the driving time of the degaussing coil is less than a reference time in case that the main power supply is turned off within the predetermined reference time. Consequently, the degaussing coil is driven regardless the time from turning off to turning on of the main power supply. Accordingly, the method for controlling the degaussing coil of the cathode ray tube can prevent the remanence of the cathode ray tube and always provide a safe image to a user.

4 Claims, 4 Drawing Sheets

T1>t1 (T1≒3 seconds)

T2>t2 (T2≒30 minutes)

METHOD FOR CONTROLLING DEGAUSSING COIL OF CATHODE RAY TUBE

BACKGROUND OF THE INVENTION

1. Field of the Invention

The present invention relates to a method for controlling a degaussing coil, and more particularly, relates to a method for controlling a degaussing coil of a cathode ray tube for preventing remanence of the cathode ray tube by improving operation condition of the degaussing coil, wherein the degaussing coil is installed around the cathode ray tube and eliminates residual magnetization.

2. Background of the Related Art

Generally, when a cathode ray tube is turned on, the momentary over current and over voltage causes remanence at the cathode ray tube. The remanence distorts and shakes an initial image. Consequently, a visually unstable image is output and makes a user watching a television receiver tired. Accordingly, a degaussing coil is installed around the cathode ray tube for eliminating the remanence generated during initial operation.

The degaussing coil is synchronized at the initial operation of the cathode ray tube and operates during a predetermined time. According to the operation of the degaussing coil, demagnetizing current having an opposite polar or a 180°-delayed phase to the residual magnetization is generated at the cathode ray tube. The residual magnetization is canceled by the demagnetizing current generated by the degaussing coil. When the operation of the degaussing coil is stopped by the interception of the current supplied to the degaussing coil after the predetermined time, the image becomes stable.

The operation time (T) of the degaussing coil is predetermined to a similar value regardless product and conventionally, is commonly set for 3 seconds. Moreover, the cathode ray tube is turned on and the degaussing coil operates, if the cathode ray tube is turned off and then turned on within a predetermined time, that is about 30 minutes, the remanence of the cathode ray tube seems to be fully eliminated, accordingly, the degaussing coil is set not to operate any more.

In the mean time, the conventional cathode ray tube has some problems hereinafter.

If the cathode ray tube is turned on and turned off before the operation time of the degaussing coil, which is a predetermined reference operation time of the degaussing coil and, for example, is set for 3 seconds, the remanence of the degaussing coil is not fully eliminated because the degaussing coil does not properly operate for a predetermined time. And, when the cathode ray tube turns on within a predetermined time, the remanence still remains because the degaussing coil does not operate any more.

SUMMARY OF THE INVENTION

Therefore, it is an object of the present invention to provide a method for controlling a degaussing coil of a cathode ray tube by checking an operation time of the degaussing coil, and re-operating the degaussing coil when the operation time of the degaussing coil is less than a reference time though the cathode ray tube is turned on again within a predetermined time.

The characteristics for achieving the object of the present invention include: a driving request for the degaussing coil is set when the time between the turning on and the turning off of a main power supply passes a predetermined operation condition setting time; the degaussing coil is operated and the driving request is set when the driving time of the degaussing coil is within the predetermined reference operation time by checking the driving time of the degaussing coil.

Here, the driving request for the degaussing coil is set when the main power supply is turned off within a predetermined reference operation time by checking the driving time of the degaussing coil.

Moreover, the predetermined reference operation time is an adequate time for fully eliminating the residual magnetization of the cathode ray tube by the demagnetizing current generated by the degaussing coil.

Moreover, the predetermined operation condition setting time is a maximum time for continuing the demagnetizing operation by the demagnetizing current generated by the degaussing coil.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferred embodiments referring to the attached drawings.

Figure 1:
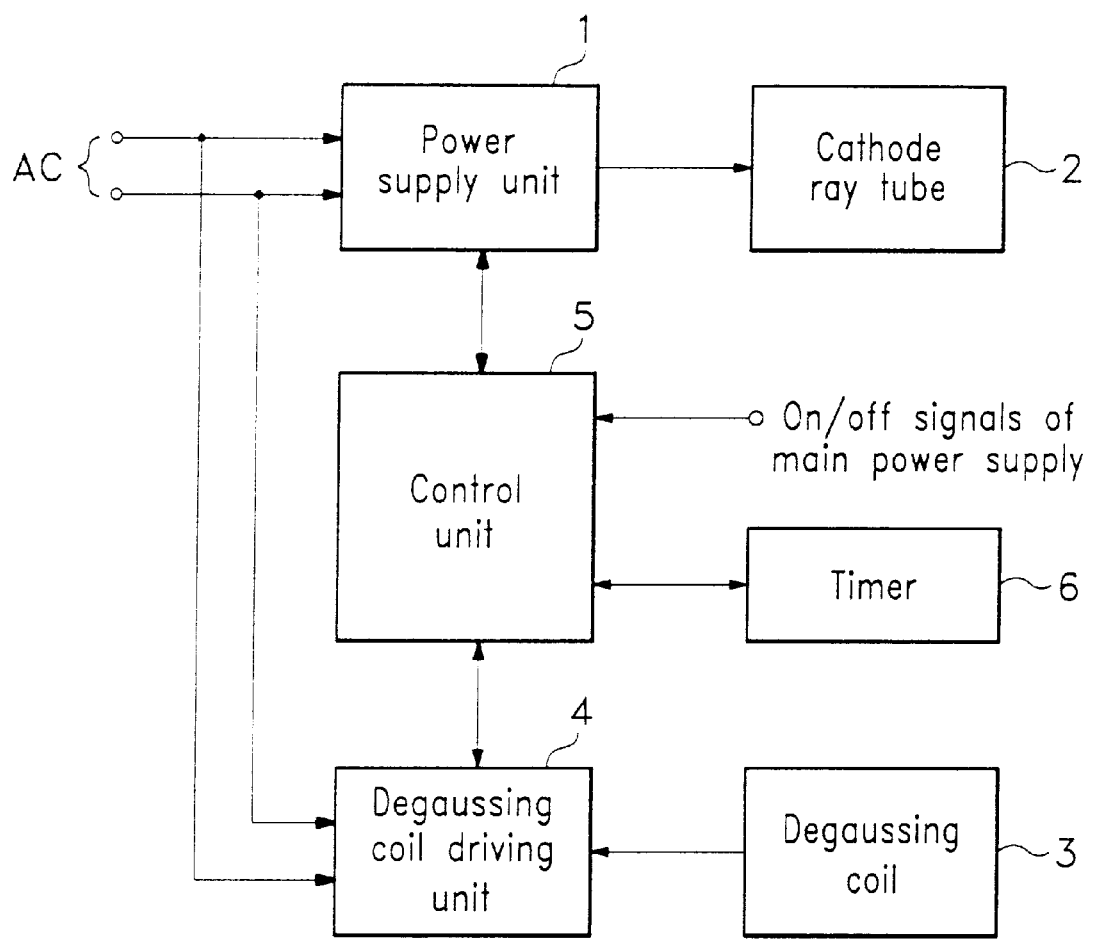
FIG. 1 is a schematic block diagram of a controlling apparatus for a degaussing coil applied to the present invention.
Figure 2A:
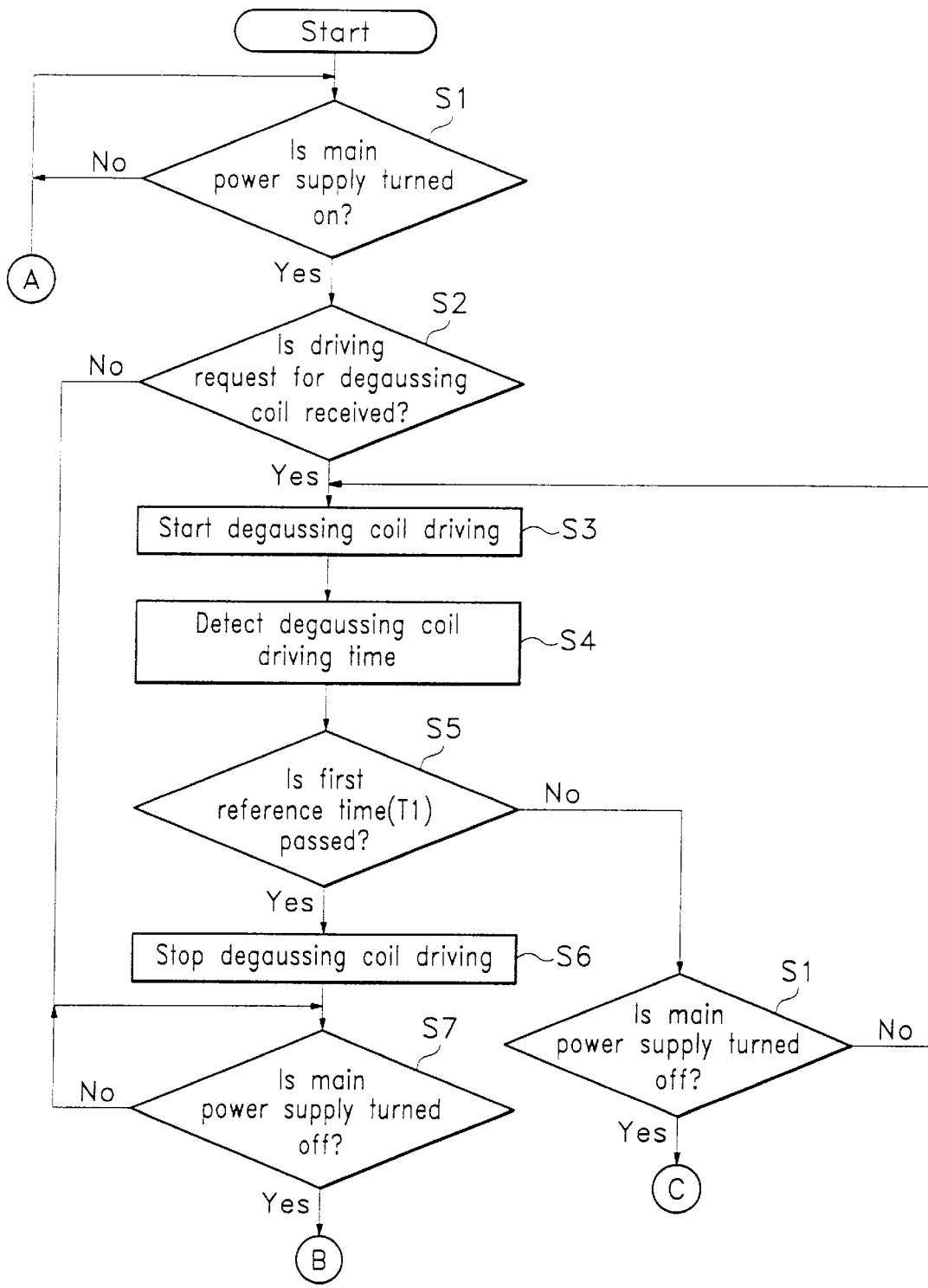
FIGS. 2A and 2B are operational flow charts illustrating executing processes of a method for controlling the degaussing coil according to the present invention.
Figure 2B:
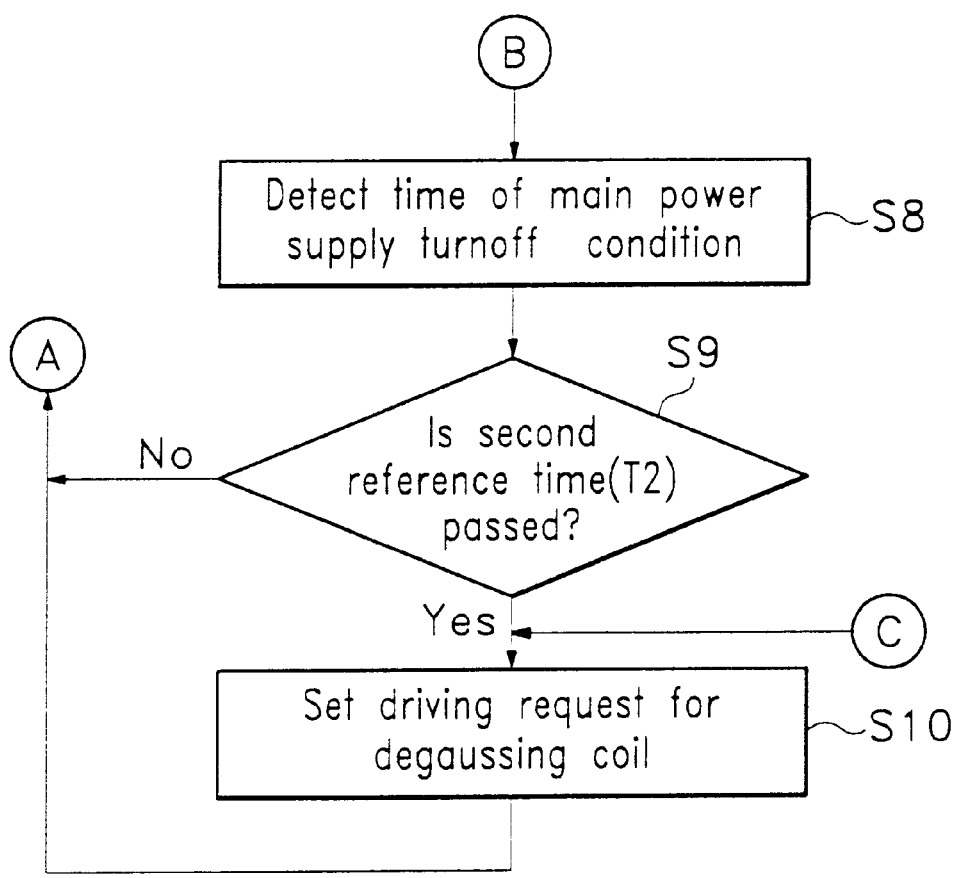
Figure 3A:
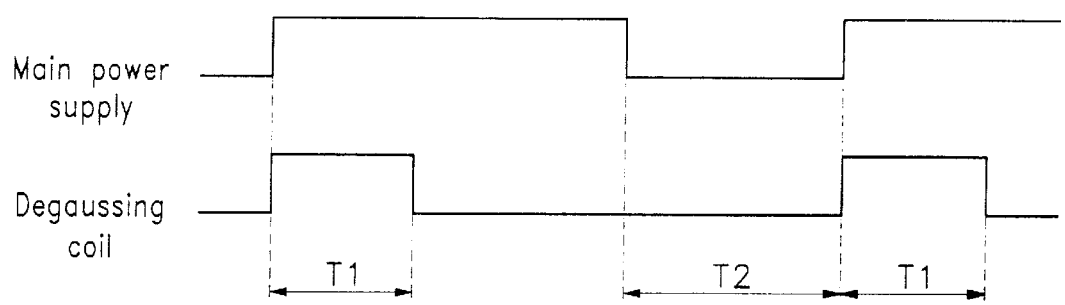
FIGS. 3A and 3B are operational timing charts of a main power supply and the degaussing coil.
Figure 3B:
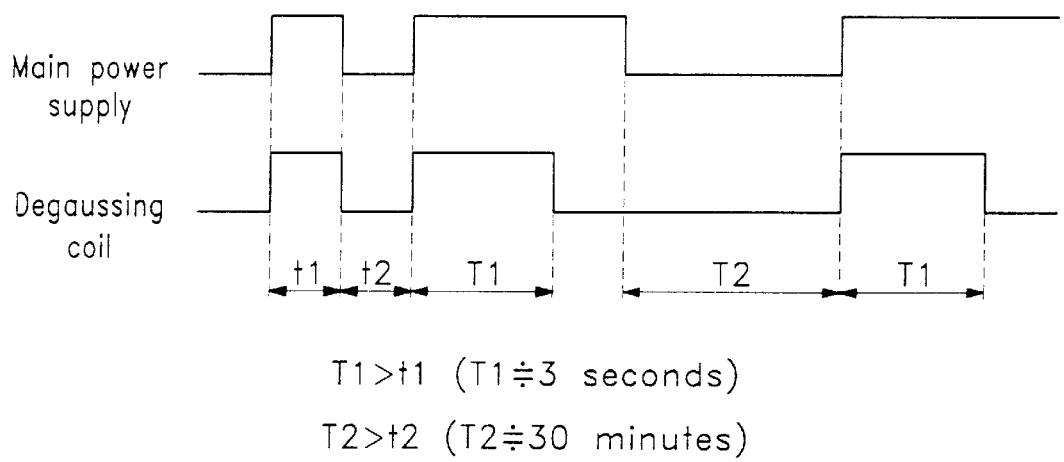

FIG. 1 is a schematic block diagram of a controlling apparatus for a degaussing coil applied to the present invention, FIGS. 2A and 2B are operational flow charts illustrating executing processed of a method for controlling the degaussing coil according to the present invention and FIGS. 3A and 3B are operational timing charts of a main power supply and the degaussing coil.

With referring to FIG. 1, the controlling apparatus for the degaussing coil of the present invention includes a power supply unit 1 for converting inputted commercial alternating current (AC) to voltage level required for each element of the cathode ray tube; the cathode ray tube 2 for forming an image by applying voltage having a predetermined level and converted by the power supply unit 1; the degaussing coil 3 for demagnetizing the remanence in the cathode ray tube 2, installed around the cathode ray tube 2; a degaussing coil driving unit 4 for controlling the driving condition of the degaussing coil 3; a control unit 5 for controlling the operating condition of the power supply unit 1 and the degaussing coil driving unit 4 according to on/off signals of the main power supply and a timer 6 for providing time information to the control unit 5.

The operation according to the present invention having above-mentioned structure will be described with referring to FIG. 2 in detail.

The main power supply of the cathode ray tube is turned on (step S1). The control unit 5 checks whether a driving request for the degaussing coil 3 is received or not (step S2). When the driving request for the degaussing coil 3 is received at the step S2, the control unit 5 controls the degaussing coil driving unit 4 and drives the degaussing coil 3 (step S3). Simultaneously, the control unit 5 detects the driving time of the degaussing coil 3 by operating the timer 6 (step S4). The control unit 5 checks whether the detected driving time of the degaussing coil 3 passes a predetermined reference operation time, that is a first reference time T1, or not (step S5).

At this step S5, when the driving time of the degaussing coil 3 passes the predetermined reference operation time, that is the first reference time T1, as shown in FIG. 3A, this means that the demagnetizing operation is fully executed by the degaussing coil 3 and, accordingly, the control unit 5 controls the degaussing coil driving unit 4 and stops the driving of the degaussing coil 3 (step S6). The control unit 5 checks whether the main power supply is turned off or not (step S7). Then, when the main power supply is turned off, the control unit 5 controls the timer 6 to start counting from the turning off of the main power supply and detects the time from the turning off to the turning on of the main power supply (step S8). The control unit 5 checks whether the time checked at the step S8 passes the predetermined operation condition setting time, that is a second reference time, T2, or not (step S9). Then, when the time from the turning off to the turning on of the main power supply passes the predetermined operation condition setting time, that is the second reference time T2, as shown in FIG. 3A, this means that the demagnetizing operation by the degaussing coil 3 is ineffective according to passing the second reference time and accordingly, the control unit 5 returns to the step S1 after setting the driving request for the degaussing coil (step S10).

If the time t2 at the step S9, that is the time from the turning off to the turning on of the main power supply, is within the predetermined operation condition setting time T2, that is T2>t2, as shown in FIG. 3B, this means that the demagnetizing operation by the degaussing coil 3 is residual. Consequently, the control unit 5 does not receive the driving request for the degaussing coil 3 and directly returns to the step S1.

In the mean time, the driving time t1 of the degaussing coil 3 at the step S5 is within the reference operation time T1, wherein the reference operation time is the first reference time T1, that is T1>t1, as shown in FIG. 3B, this means that the demagnetizing operation by the degaussing coil 3 is not fully executed. Consequently, when the main power supply is turned off (step S11), the control unit 5 progresses to the step S10 and sets the driving request for the degaussing coil 3.

Moreover, if the main power supply is not turned off at the step S11, the control unit 5 returns to the step S4 and continuously checks the driving time of the degaussing coil 3 until the driving time of the degaussing coil 3 passes the reference operation time, that is the first reference time T1.

In the mean time, when the driving request for the degaussing coil 3 does not received at the step S2, the control unit 5 directly progresses to the step S7 and repeatedly executes all processes after the step S7.

Accordingly, when the driving time of the degaussing coil 3 is not fully executed, the degaussing coil 3 is driven at each turning on of the main power supply regardless the time from the turning off to the turning on of the main power supply. Consequently, the remanence can be prevented.

Finally, the advantage of the present invention will be described hereinafter.

The method for controlling the degaussing coil of the cathode ray tube can prevent the remanence of the cathode ray tube and always provide a safe image to a user by re-driving the degaussing coil in case that the cathode ray tube is turned on within the predetermined time if the operation time of the degaussing coil is less than the predetermined reference time by checking the operation time of the degaussing coil.

As the terms mentioned in the specification are determined based upon the function of the present invention, and they can be changed according to the technician's intention or a usual practice, the terms should be determined considering the overall contents of the specification of the present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling a degaussing coil of a cathode ray tube for preventing residual magnetization of the cathode ray tube, comprising the steps of:

detecting the time from a time turning off to the turning on of a main power supply when a driving request for said degaussing coil is not received after the main power supply is turned on, setting firstly the driving request for said degaussing coil when said detected time passes a predetermined operation condition setting time;

driving said degaussing coil when the driving request for said degaussing coil is received; and detecting the driving time of said degaussing coil, setting secondly the driving request of said degaussing coil when the driving time of said degaussing coil is less than a predetermined reference operation time.

2. The method for controlling the degaussing coil of the cathode ray tube of claim 1, wherein at the second setting step, the driving request for said degaussing coil is set when said main power supply is turned off within the predetermined reference operation time.

3. The method for controlling the degaussing coil of the cathode ray tube of claim 1, wherein said reference operation time is the time for being eliminated residual magnetization of said cathode ray tube by demagnetizing current generated from said degaussing coil.

4. The method for controlling the degaussing coil of the cathode ray tube of claim 1, wherein said operation condition setting time is a maximum time for continuing demagnetizing operation by said demagnetizing current generated from said degaussing coil.

* * * * *